(12) United States Patent
Li et al.

(10) Patent No.: US 10,288,159 B2
(45) Date of Patent: May 14, 2019

(54) INTEGRATED CLUTCH SYSTEMS FOR TORQUE CONVERTERS OF VEHICLE POWERTRAINS

(71) Applicant: GM GLOBAL TECHNOLOGY OPERATIONS LLC, Detroit, MI (US)

(72) Inventors: Dongxu Li, Troy, MI (US); Farzad Samie, Franklin, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 111 days.

(21) Appl. No.: 15/587,787

(22) Filed: May 5, 2017

(65) Prior Publication Data

US 2017/0328455 A1    Nov. 16, 2017

Related U.S. Application Data

(60) Provisional application No. 62/335,909, filed on May 13, 2016.

(51) Int. Cl.
*F16H 45/02* (2006.01)
*F16D 21/00* (2006.01)
(Continued)

(52) U.S. Cl.
CPC ............. *F16H 45/02* (2013.01); *F16D 13/40* (2013.01); *F16D 21/00* (2013.01); *F16D 47/04* (2013.01);
(Continued)

(58) Field of Classification Search
None
See application file for complete search history.

(56) References Cited

U.S. PATENT DOCUMENTS 4,703,840 A * 11/1987 Bopp ..................... F16D 13/12
464/24
4,860,861 A    8/1989 Gooch et al.
(Continued)

FOREIGN PATENT DOCUMENTS

CN    201071914 Y    6/2008
CN    101506546 A    8/2009
(Continued)

OTHER PUBLICATIONS

Hybrid Powertrain System—Major Components.

*Primary Examiner* — Mark A Manley
(74) *Attorney, Agent, or Firm* — Quinn IP Law

(57) ABSTRACT

Disclosed is a hydrokinetic torque converter (TC) with a TC housing. An impeller is disposed within the TC housing and connects to an engine output shaft. A turbine is disposed within the TC housing and connects to a transmission input shaft via a TC output shaft. A torque converter clutch (TCC), which is disposed within the TC housing and coupled to the TC output shaft, selectively locks the impeller to the TC output shaft. A damper, which is disposed within the TC housing and coupled to the TCC, dampens vibrations transmitted by the TCC. A disconnect device, which is disposed within the TC housing and coupled to the damper assembly and TC output shaft, connects the turbine to the TC output shaft or damper when positive torque is being transferred, and disconnects the turbine and TC output shaft or damper when negative torque is being transferred.

20 Claims, 2 Drawing Sheets

(51) Int. Cl.
  *F16D 13/40* (2006.01)
  *F16D 47/04* (2006.01)
  *F16H 45/00* (2006.01)
  *F16D 41/12* (2006.01)
  *F16D 41/069* (2006.01)
  *F16D 41/064* (2006.01)

(52) U.S. Cl.
  CPC .......... *F16D 41/064* (2013.01); *F16D 41/069* (2013.01); *F16D 41/12* (2013.01); *F16H 2045/005* (2013.01); *F16H 2045/007* (2013.01); *F16H 2045/0205* (2013.01); *F16H 2045/0221* (2013.01); *F16H 2045/0278* (2013.01); *F16H 2045/0294* (2013.01)

(56) References Cited

U.S. PATENT DOCUMENTS

| | | | |
|---|---|---|---|
| 4,889,012 A * | 12/1989 | Dull | F16H 45/02 475/53 |
| 5,947,243 A | 9/1999 | MacDonald | |
| 7,198,587 B2 | 4/2007 | Samie et al. | |
| 7,681,675 B2 | 3/2010 | Samie et al. | |
| 7,703,590 B2 * | 4/2010 | Heck | F16H 41/24 192/3.25 |
| 7,862,437 B2 | 1/2011 | Clark et al. | |
| 7,931,561 B2 | 4/2011 | Otanez et al. | |
| 7,980,992 B2 | 7/2011 | Sturgin | |
| 8,011,464 B2 | 9/2011 | Samie et al. | |
| 8,252,125 B2 | 8/2012 | Giefers et al. | |
| 8,778,261 B2 | 7/2014 | Nakamura et al. | |
| 8,932,416 B2 | 1/2015 | Nakanishi et al. | |
| 8,992,697 B2 | 3/2015 | Matsuda et al. | |
| 9,359,663 B2 | 6/2016 | Mizuta et al. | |
| 9,475,113 B2 | 10/2016 | Naitou et al. | |
| 9,512,499 B2 | 12/2016 | Tomokiyo et al. | |
| 9,593,392 B2 | 3/2017 | John et al. | |
| 9,598,745 B2 | 3/2017 | Hayashi et al. | |
| 9,605,329 B2 | 3/2017 | Nonaka et al. | |
| 9,611,518 B2 | 4/2017 | Naitou et al. | |
| 9,617,624 B2 | 4/2017 | Tanahashi et al. | |
| 9,644,247 B2 | 5/2017 | Matsuda et al. | |
| 9,725,782 B2 | 8/2017 | Nonaka et al. | |
| 9,840,751 B2 | 12/2017 | Hayashi et al. | |
| 9,850,554 B2 | 12/2017 | Naitou et al. | |
| 9,896,736 B2 | 2/2018 | Tomokiyo et al. | |
| 9,920,407 B2 | 3/2018 | Nonaka et al. | |
| 9,945,013 B2 | 4/2018 | Nonaka et al. | |
| 10,029,294 B2 | 7/2018 | Yamano et al. | |
| 10,030,280 B2 | 7/2018 | Hayashi et al. | |
| 10,072,324 B2 | 9/2018 | Nonaka et al. | |
| 2002/0153217 A1 | 10/2002 | Sato | |
| 2010/0273603 A1 * | 10/2010 | Roses | B60K 6/48 477/5 |
| 2014/0251744 A1 * | 9/2014 | Steinberger | F16H 45/00 192/3.25 |

FOREIGN PATENT DOCUMENTS

| | | |
|---|---|---|
| CN | 101832379 A | 9/2010 |
| EP | 0200335 A2 | 11/1986 |
| JP | 2014182793 A | 9/2014 |

* cited by examiner

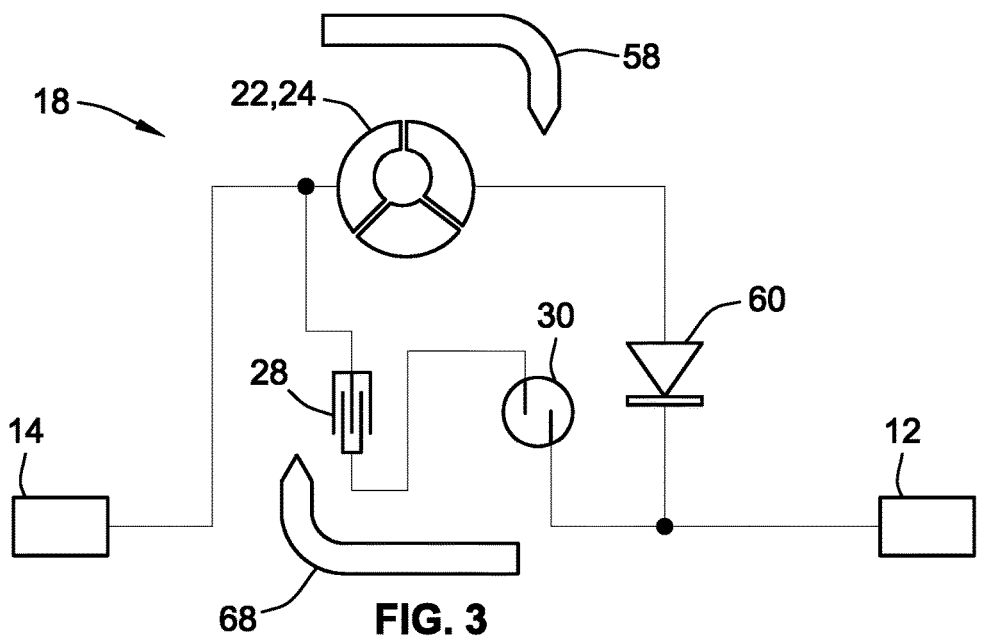
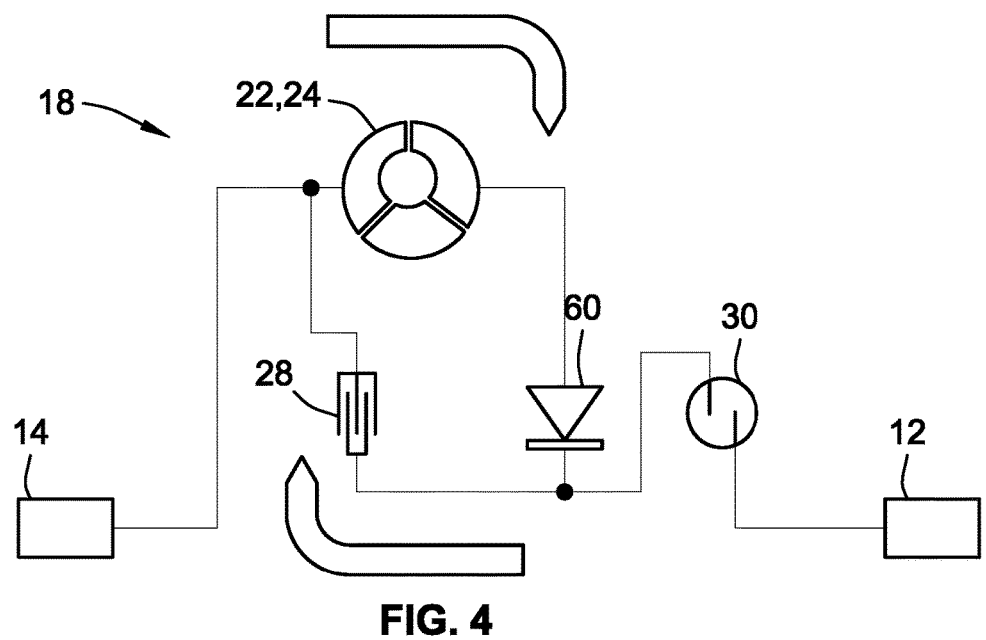

INTEGRATED CLUTCH SYSTEMS FOR TORQUE CONVERTERS OF VEHICLE POWERTRAINS

CROSS-REFERENCE AND CLAIM OF PRIORITY TO RELATED APPLICATION

This application claims the benefit of and the right of priority to U.S. Provisional Patent Application No. 62/335,909, filed on May 13, 2016, which is incorporated herein by reference in its entirety and for all purposes.

INTRODUCTION

The present disclosure relates generally to motor vehicle powertrains. More specifically, aspects of this disclosure relate to disconnect devices for operatively disengaging torque converters from internal combustion engines.

Many available motor vehicles, such as the modern-day automobile, include a powertrain that operates to propel the vehicle and power the onboard vehicle electronics. The powertrain, which is inclusive of and sometimes improperly referred to as a drivetrain, is generally comprised of an engine that delivers driving power to the vehicle's final drive system (e.g., rear differential, axle, and wheels) through a multi-speed power transmission. Automobiles have traditionally been powered by a reciprocating-piston type internal combustion engine (ICE) because of its ready availability and relatively inexpensive cost, light weight, and overall efficiency. Such engines include 2- or 4-stroke compression-ignited diesel engines and 4-stroke spark-ignited gasoline engines.

Hybrid vehicles, on the other hand, utilize alternative power sources to propel the vehicle, minimizing reliance on the engine for power and thereby increasing overall fuel economy. A hybrid electric vehicle (HEV), for example, incorporates both electric energy and chemical energy, and converts the same into mechanical power to propel the vehicle and power the vehicle systems. The HEV generally employs one or more electric machines (E-machine), such as electric motor-generators, that operate individually or in concert with an internal combustion engine to propel the vehicle. Since hybrid vehicles can derive their power from sources other than the engine, engines in hybrid vehicles can be turned off while the vehicle is propelled by the alternative power source(s).

Many motor vehicles employ a hydrokinetic torque converter that is disposed between the powertrain's prime mover (e.g., engine) and a driven load (e.g., multi-speed transmission) to control the transfer of rotational torque therebetween. A torque converter may include an impeller that is coupled to the engine's output shaft, a turbine that is coupled to the transmission's input shaft, and a stator interposed between the impeller and turbine to regulate fluid flow between their respective fluid volumes. A hydraulic pump modulates fluid pressure within the torque converter housing to govern the transfer of rotational energy from the impeller to the turbine. Hydraulic fluid can also be bled from the housing to operatively disengage the engine crankshaft from the transmission input shaft and to multiply torque (e.g., function as a pseudo-reduction gear) to offset significant differences between input and output rotational speeds.

A torque converter may generally be typified as a fluid coupling that allows the engine to transfer power to the final drive system for vehicle propulsion, and allows the crankshaft to spin, without the engine stalling, when the vehicle wheels and transmission gears come to a stop. For instance, if the engine is rotating slowly (e.g., when the vehicle is braking to a stop or idling at a stop light), hydraulic pressure is reduced such that the amount of torque passed through the torque converter is very small so that the vehicle may be kept still with light pressure on a brake pedal. To accelerate the vehicle, the pump increases internal fluid pressure, thereby causing increased amounts of torque to be transmitted from the impeller through the turbine to the transmission for launching the vehicle. For manual transmissions, the torque converter is typically replaced with a driver-operated clutch engaged and disengaged by a foot pedal.

Some torque converters are equipped with a clutch mechanism that is engaged to rigidly connect the engine crankshaft to the transmission input shaft, e.g., to avoid unwanted slippage and resultant efficiency losses. System "slip" occurs because the rotational speed of the impeller relative to the turbine in the torque converter is inherently different. A large slip percentage between the engine output and the transmission input affects the fuel economy of the vehicle; employing a torque converter clutch (TCC) helps to reduce the slip between the engine and the transmission. The TCC operates to mechanically lock the impeller at the output of the engine to the turbine at the input of the transmission so that the engine output and transmission input rotate at the same speed. Application of the TCC may be controlled by an electronic controller to modify clutch engaging forces under certain operating conditions, for example, during shifts to eliminate undesired torque fluctuations and engine speed changes during transient periods when torque flow interruption is desired.

SUMMARY

Disclosed herein are vehicle torque converters with an integrated disconnect device, methods for making and methods for using such torque converters, and motor vehicles with a hydrokinetic torque converter having an integrated disconnect device for operatively disengaging from an internal combustion engine. By way of example, and not limitation, a novel engine disconnect in the form of a one way clutch (OWC) is packaged within the torque converter (TC) housing and integrated with a torque converter clutch (TCC) and torsional damper assembly. The OWC may be placed in parallel with the TCC, coupled to the turbine shell and to the damper tang of the torsional damper assembly. To utilize existing packaging space, the OWC may be positioned between the stator and the clutch plate of the TCC. Alternative configurations may place the OWC in series with the TCC, interposed between the TCC and the torsional damper assembly. The OWC may be a passive clutching mechanism, such as a one-way freewheeling sprag or ratchet clutch, or may be an active clutching mechanism, such as an electrically actuated one-way clutch or a hydraulically actuated one-way clutch (HOWC).

Attendant benefits for at least some of the disclosed concepts include improved engine disconnect capabilities to avoid losses from engine motoring during engine "Stop & Start" (S/S) and during regenerative braking. These features are most effective for, but certainly not limited to, automatic transmission (AT) sailing (i.e., high-speed vehicle coasting during engine shutoff) and for P2/P3/P4 hybrid electric architectures (P2=E-machine on transmission input side; P3=E-machine on transmission output side; P4=E-machine direct connect to axle drive). With the proposed system architecture and control methodology, additional fuel economy is achieved with minimum additional cost and no additional powertrain packaging space. The proposed concepts also help to reduce transmission delay during engine restart, while ensuring a smooth transition with little impact on drive quality.

Aspects of the present disclosure are directed to torque converter assemblies for motor vehicle powertrains. Disclosed, for example, is a hydrokinetic torque converter for operatively connecting an engine with a power transmission of a motor vehicle. The torque converter assembly includes a torque converter (TC) housing with an internal fluid chamber. An impeller—with impeller blades rotatable within the fluid chamber—is configured to operatively connect to an engine output shaft. A turbine—with turbine blades rotatable within the fluid chamber—is configured to operatively connect to a transmission input shaft via a TC output shaft. The TC assembly also includes a torque converter clutch (TCC) disposed within the TC housing and coupled to the TC output shaft. The TCC is selectively actuable to lock the impeller to the TC output shaft. A damper assembly is disposed within the TC housing and coupled to the TCC. This damper assembly is configured to dampen vibrations transmitted by the TCC. A disconnect device, which is disposed within the TC housing, is coupled to the damper assembly and the TC output shaft. The disconnect device is configured to connect the turbine to the TC output shaft or the damper when positive torque is being transferred from the turbine to the TC output shaft or the damper. The disconnect device is also configured to disconnect the turbine from the TC output shaft when the torque converter reverses its direction.

Other aspects of the present disclosure are directed to motor vehicles with torque converter assemblies having integrated engine disconnects. A "motor vehicle," as used herein, may include any relevant vehicle platform, such as passenger vehicles (internal combustion engine (ICE), hybrid, electric, fuel cell, etc.), commercial vehicles, industrial vehicles, buses, all-terrain vehicles (ATV), farm equipment, boats, airplanes, etc. In one example, a motor vehicle is disclosed that includes a vehicle powertrain with an internal combustion engine having an engine output shaft and a multi-speed power transmission having transmission input and output shafts. A final drive system connects the transmission output shaft to front and/or rear drive wheels. A torque converter assembly operatively connects the internal combustion engine to the power transmission.

The torque converter assembly in the foregoing example includes a torque converter (TC) housing with an internally defined fluid chamber. An impeller includes impeller blades rotatable inside the fluid chamber. The impeller also includes a pump shell that is operatively connected to the engine output shaft via a front cover. A turbine includes turbine blades rotatable inside the fluid chamber. The turbine also includes a turbine shell that is operatively connected to the transmission input shaft via a TC output shaft. A torque converter clutch (TCC), which is disposed inside the TC housing, includes a clutch plate coupled to the TC output shaft. The TCC is selectively actuable to lock the pump shell to the TC output shaft. A torsional damper assembly, which is disposed inside the TC housing, is coupled to the TCC. The damper assembly is configured to dampen vibrations transmitted by the TCC. A passive-type one-way clutch (OWC) is disposed inside the TC housing and coupled to the damper assembly and the TC output shaft. The OWC automatically connects the turbine shell to the TC output shaft or the damper when positive torque is being transferred from the turbine to the TC output shaft or the damper; the OWC automatically disconnects the turbine shell from the TC output shaft when the torque reverses its direction.

According to other aspects of the present disclosure, methods of making and methods of using motor vehicle torque converters are presented. For instance, a method is disclosed for constructing a hydrokinetic torque converter assembly that operatively connects an engine with a power transmission of a motor vehicle. The method includes: attaching an impeller with impeller blades to a torque converter (TC) housing with an internal fluid chamber such that the impeller blades are rotatable within the fluid chamber, the impeller being configured to operatively connect to the engine output shaft; attaching a turbine with turbine blades to the TC housing such that the turbine blades are rotatable within the fluid chamber, the turbine being configured to operatively connect to the transmission input shaft via a TC output shaft; attaching a torque converter clutch (TCC) to the TC output shaft within the TC housing, the TCC being selectively actuable to lock the impeller to the TC output shaft; attaching a damper assembly to the TCC within the TC housing, the damper assembly being configured to dampen vibrations transmitted by the TCC; and, attaching a disconnect device to the damper assembly and the TC output shaft within the TC housing. The disconnect device is configured to connect the turbine to the TC output shaft or the damper when positive torque is being transferred from the turbine to the TC output shaft or the damper. The disconnect device is also configured to disconnect the turbine from the TC output shaft when the torque converter reverses its direction.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

FIG. 3 is a schematic block diagram of the torque converter with integrated disconnect device of FIG. 2.

FIG. 4 is a schematic block diagram of a torque converter with an integrated disconnect device in accordance with other aspects of the present disclosure.

Figure 1:
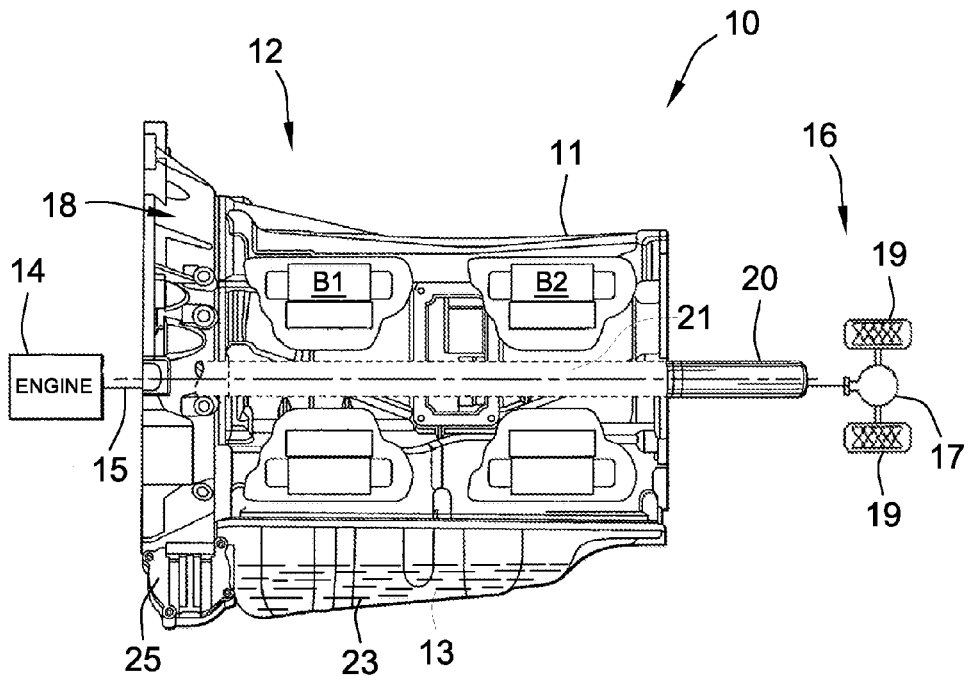
FIG. 1 is a schematic illustration of a representative motor vehicle with a powertrain having a final drive system drivingly connected to an engine by a power transmission in accordance with aspects of the present disclosure.

The present disclosure is susceptible to various modifications and alternative forms, and some representative embodiments have been shown by way of example in the drawings and will be described in detail herein. It should be understood, however, that the novel aspects of this disclosure are not limited to the particular forms disclosed. Rather, the disclosure is to cover all modifications, equivalents, combinations, subcombinations, and alternatives falling within the spirit and scope of the disclosure as defined by the appended claims.

DETAILED DESCRIPTION OF THE ILLUSTRATED EMBODIMENTS

This disclosure is susceptible of embodiment in many different forms. There are shown in the drawings and will herein be described in detail representative embodiments of the disclosure with the understanding that the present disclosure is to be considered as an exemplification of the principles of the disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

Referring now to the drawings, wherein like reference numbers refer to like features throughout the several views, there is shown in FIG. 1 a schematic illustration of a representative automobile, designated generally at 10, with a P3 hybrid-electric powertrain configuration. The illustrated automobile 10—also referred to herein as "motor vehicle" or "vehicle" for short—is merely an exemplary application with which the novel aspects of this disclosure may be practiced. In the same vein, the implementation of the present concepts into a P3 hybrid electric architecture should also be appreciated as an exemplary application of the novel concepts disclosed herein. As such, it will be understood that the aspects and features of the present disclosure may be integrated into other vehicle powertrain configurations and utilized for any logically relevant type of motor vehicle. Lastly, the hybrid powertrain architecture shown in FIG. 1 hereof has been greatly simplified, it being understood that further information regarding the standard construction and operation of a hybrid vehicle is known.

The exemplary vehicle powertrain system is shown in FIG. 1 with a restartable engine 14 that is drivingly connected to a final drive system 16 by a multi-speed power transmission 12. The engine 14 transfers power, preferably by way of torque through an engine crankshaft 15, to an input side of the transmission 12. The transmission 12, in turn, is adapted to manipulate and distribute power from the engine 14 to the final drive system 16, represented herein by a differential 17 and a pair of drive wheels 19, and thereby propel the hybrid vehicle. In the example depicted in FIG. 1, the engine 14 may be any now known or hereinafter developed engine, such as a 2-stroke or 4-stroke diesel or a 4-stroke gasoline engine, which is readily adapted to provide its available power output typically at a number of revolutions per minute (RPM). Although not explicitly portrayed in FIG. 1, it should be appreciated that the final drive system 16 may comprise any known configuration, e.g., front wheel drive (FWD), rear wheel drive (RWD), four-wheel drive (4WD), all-wheel drive (AWD), etc.

FIG. 1 also displays selected components of the electrohydraulic transmission 12, including a main housing 11 that encases first and second electric motor/generator assemblies B1 and B2, respectively. These motor/generators B1, B2 may be indirectly journaled onto a main shaft 21 of the transmission 12, preferably through a series of planetary gear sets (not shown). The motor/generators B1, B2 operate with one or more selectively engageable torque transmitting mechanisms (e.g., clutch, brake, etc., not shown herein) to rotate the transmission output shaft 20. An oil pan or sump volume 23 is located on the base of the main housing 11, and is configured to provide hydraulic fluid, such as transmission oil (shown hidden in FIG. 1 at 13) for the transmission 12 and its components. The main housing 11 covers the innermost components of the transmission 12, such as the motor/generators B1, B2, planetary gear arrangements, main shaft 21, and torque transmitting devices (all of which are mentioned for explanatory purposes and not all are shown). Additionally, an auxiliary pump 25 is mounted to the base of the input housing 11, and secured nestably adjacent the oil pan 23. Finally, a hydrodynamic torque converter assembly, identified generally as 18, is operatively positioned between the engine 14 and transmission 12.

Figure 2:
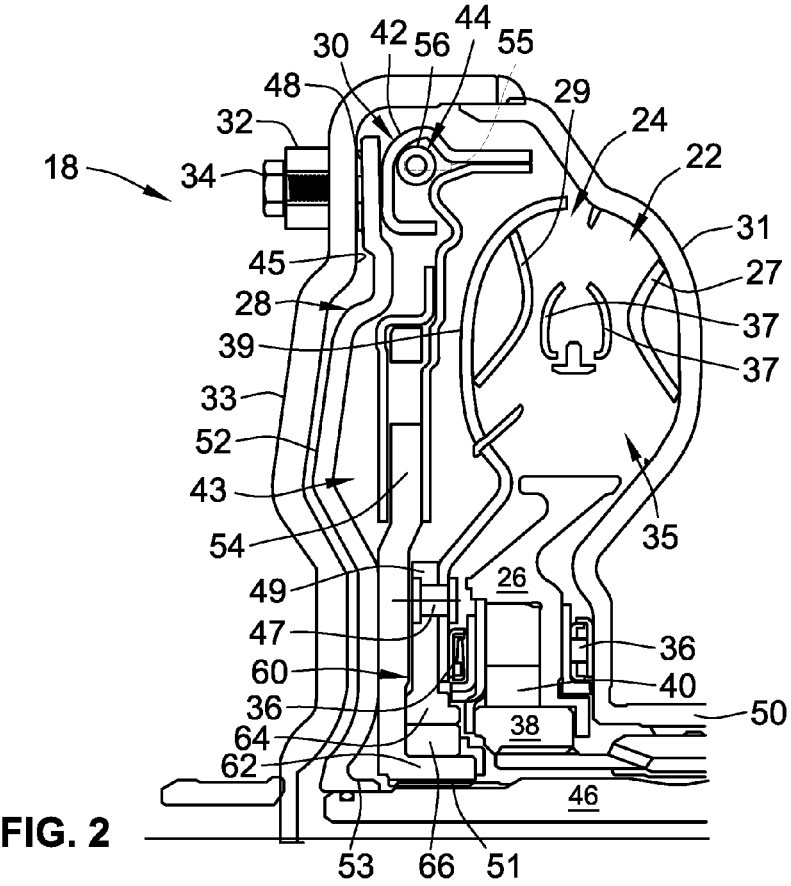
FIG. 2 is a cross-sectional side-view illustration of a portion of the power transmission of FIG. 1 showing a representative torque converter with an integrated disconnect device in accordance with aspects of the present disclosure.

FIG. 2 is a cross-sectional side-view illustration of a portion of the representative torque converter assembly 18. Hydrokinetic torque converter assembly 18 is a fluid coupling for operatively connecting the ICE 14 with the epicyclic gearing of the power transmission 12. The torque converter assembly 18 includes a torque converter impeller 22, a bladed turbine 24, a stator 26, a lockup or bypass clutch 28, and a torsional damper assembly 30. To protect these components, the torque converter assembly 18 is constructed with an annular housing, defined principally by a pump shell portion 31 fixedly attached, e.g., via electron beam welding, mig welding, laser welding, and the like, to an engine-side, front cover 33 such that a working hydraulic fluid chamber 35 is formed therebetween. A flexplate (not shown) is connected to circumferentially spaced lugs 32 projecting from the front cover 33, e.g., via bolts 34, to drivingly connect the annular housing front cover 33 to the engine 14 such that rotational power is transferable back-and-forth therebetween.

The impeller 22, also referred to in the art as "pump," is situated in serial power-flow fluid communication with the turbine 24. Interposed between the impeller 22 and turbine 24 is a stator 26 that selectively alters fluid flow returning from the turbine 24 to the impeller 22 such that returning fluid aids, rather than impedes, rotation of the impeller. The transfer of engine torque from the crankshaft 15 to the turbine 24 via the annular housing front cover 33 and impeller 22 is through the operation of hydraulic fluid, such as transmission oil 13, in the fluid chamber 35. More specifically, rotation of the impeller blades 27, retained between the pump shell 31 and inner shroud 37, causes the hydraulic fluid 13 to be directed toroidally outward toward the turbine 24. When this occurs with sufficient force to overcome the inertial resistance to rotation, the turbine blades 29, coaxially oriented with the impeller blades 27 and retained between the inner shroud 37 and turbine shell 39, begin to rotate with the impeller 22. The fluid flow exiting the turbine 24 is directed back into the impeller 22 by way of the stator 26. The stator 26, located between the flow exit section of the turbine 24 and the flow entrance section of the impeller 22, redirects the fluid flow from the turbine 24 to the impeller 22 in the same direction as impeller rotation, thereby reducing pump torque and causing torque multiplication.

Also disposed within the housing of the torque converter assembly 18 is a pair of thrust bearings 36 that rotatably support the stator 26. The stator 26 is connected to a stator shaft 38 by way of a roller clutch 40 that is operable to prevent rotation of the stator 26 at low torque converter speeds. At higher torque converter speeds, the direction of hydraulic fluid 13 leaving the turbine 24 changes, causing the stator 26 to over-run the roller clutch 40 and rotate freely on the stator shaft 38. The impeller 22 is secured to a pump hub 50, whereas the turbine 22 is rotatably mounted onto a TC output shaft 46. As shown, a turbine hub 49 is disposed between, and configured to operatively couple together the turbine 24 and the TC output shaft 46. The turbine hub 49 is secured to the turbine 24, for example, by a plurality of rivets 47, and engages the TC output shaft 46, for example, by a one-way clutch 60 with a splined interface 51.

Fundamentally, as the internal combustion engine 14 operates at different rotational speeds it may produce torsional vibrations (colloquially known as "torsionals"). By way of example, when fuel is being fed to the engine 14 and it is under power, e.g., through engagement of the fuel throttle (not shown herein) during normal operation, the engine 14 may produce torsionals that are undesirable to transmit to, and through the transmission 12. In addition, when the engine 14 is not being fueled or is not under power (e.g., in a startup and/or a shutdown operation) the engine pistons may generate compression pulses. Both the torsionals and compression pulses may produce resultant vibrations and noise that may be sensed by a vehicle occupant.

To cancel out the torsionals and compression pulses that may be produced by the engine 14, the torque converter assembly 18 is equipped with a torsional damper assembly 30, as shown in FIG. 2. As will be described in detail below, the torsional damper assembly 30 generally functions to isolate the transmission 12 from unwanted torsionals generated by the engine 14 during operation and also to selectively aide the first and second motor/generator assemblies B1, B2 in canceling engine compression pulses during startup and shutdown operations.

The torsional damper assembly 30 includes an annular damper flange 42, having one or more spring-mass damper systems, referred to hereinafter as "SDS" and identified generally as 44, spaced circumferentially around and positioned proximate to its outer periphery. The damper flange 42 is attached, secured, or extended from a clutch plate 52 (e.g., by means of soldering, mechanical fastener, rivet, etc.). The engine side front cover 33 is affixed, as described above, to the engine crankshaft 15 by way of the interconnection between the flexplate to a crankshaft pilot. In addition to operating to transmit torque produced by the engine 14 to the transmission 12, the flexplate also functions to absorb thrust loads that may be generated by the torque converter 18 hydrodynamics and/or through operation of the lockup clutch 28.

Located inside a fluid cavity 43 adjacent the turbine shell 39 is a lockup clutch 28 (also referred to herein as torque converter clutch (TCC)) to provide a direct driving connection between the engine 14 and transmission 12. The lockup clutch 28 comprises a clutch plate 52 that is operable to selectively frictionally engage a friction surface or friction material 48 with an inner contact surface 45 of the front cover 33. The clutch plate 52 is slidably supported at an annular clutch hub portion 53 thereof on a proximal end of the TC output shaft 46. For at least some configurations, the clutch plate 52 moves in response to hydraulic fluid, i.e., transmission oil 13, fed into fluid cavity 43 from an oil source, such as sump volume 23. When the lockup clutch 28 is fully engaged (i.e., when there is no slip between the friction material 36 and surface 37 of the front cover 33) the impeller 22 is frictionally coupled to the turbine 24 such that the two components rotate as a single unit, allowing the engine 14 to effectively circumvent the torque converter assembly 18 and transmit power directly to the transmission 12 without resultant efficiency losses associated with operation of the hydraulic fluid 13.

With continuing reference to FIG. 2, the front cover 33 operates in conjunction with an annular driven plate extension 54 (also referred to herein as "damper tang") to sandwich therebetween the TCC 28 and torsional damper assembly 30. The damper tang 54 is attached or joined at a base portion thereof, e.g., by way of OWC 60, to the turbine shell 39, and functions to mechanically engage with, and thereby actuate the individual SMS 44. The damper tang 54 includes a plurality of individual flange portions, shown hidden in FIG. 2 as 55, each extending axially into a respective seat portion of the damper flange 42. As the TC lockup clutch 28 is engaged (i.e., the friction material/surface 48 on clutch plate 52 is urged against contact surface 45 of front cover 33 through operation of the hydraulic fluid 13) and begins to transmit torque (i.e., gain torque capacity independent of the turbine 24), the torsional damper assembly 30 is rotated about its central axis. As a result of this rotational motion, a spring retainer of each SMS 44 is pressed against a respective flange portion 55 of the damper tang 54, thereby compressing the springs 56. This interaction may be used to absorb and dampen unwanted torsionals produced by the engine 14 during normal, startup, and shutdown operations, as some non-limiting examples.

Packaged within the TC housing 31, 33—integrated with the torque converter clutch (TCC) 28 and torsional damper assembly 30—is an engine disconnect device for operatively disengaging the hydrokinetic torque converter 18 from the internal combustion engine 14. By way of non-limiting example, this engine disconnect device may take on a variety of different mechanical diode configurations that are designed for high lock-up torque along with virtually wear-free overrunning operation. While is it preferable, for at least some embodiments, that the engine disconnect device comprise a passive clutching mechanism, it is also envisioned that the device take on active clutching mechanism configurations. In accord with the example illustrated in FIG. 2, the engine disconnect device is a passive one-way clutch (OWC) mechanism 60 that is directly coupled to both the damper assembly 30 and the TC output shaft 46. To utilize existing packaging space within the TC housing, the OWC 60 can be sandwiched between the stator 26 and the clutch plate 52 of the TCC 28, e.g., adjacent a proximal thrust bearing 36, while mounted concentric with the TC output shaft 46 and circumscribed by the annular damper flange 42. With this architecture, the OWC 60 is placed in parallel power-flow communication with the TCC 28 and torsional damper assembly 30, and in series power-flow communication with the impeller 22 and turbine 24, as seen in FIG. 3. In FIG. 3, it is also possible to reverse the order of the TCC 28 and torsional damper assembly 30 such that the TCC 28 is downstream from the damper assembly 30.

Another optional variation to FIG. 3 would be to place a second torsional damper assembly 30 downstream from the node connecting the TCC 28, torsional damper assembly 30, and OWC 60 to the power transmission 12. As yet another option, a second torsional damper assembly 30 may be interposed between the OWC 60 and the impeller/turbine 22, 24. In the same vein, a second torsional damper assembly 30 may be interposed between the OWC 60 and the node connecting the TCC 28, torsional damper assembly 30, and OWC 60 to the power transmission 12. Alternative configurations may place the OWC 60 in parallel power-flow communication with the TCC 28 alone, and in series power-flow communication with the turbine 24 and damper assembly 30, as seen in FIG. 4. It is also possible to modify FIG. 4 and place the OWC 60 upstream from the impeller/turbine 22, 24, interposed between the illustrated node and the impeller/turbine 22, 24. In this instance, the OWC outer race 64 may be rigidly secured to the turbine 24, and the inner race 62 is coupled to the TCC clutch plate 52. Any combination and sub-combination of the above optional configurations is also deemed part of this disclosure.

OWC 60 disconnect device functions to automatically operatively connect (or "lock") the turbine 24 to the TC output shaft 46 when positive torque is being transferred from the turbine to the TC output shaft. Conversely, the OWC 60 functions to automatically operatively disconnect (or "overrun") the turbine 24 from the TC output shaft 46 when the torque reverses direction. In the example illustrated in FIG. 2, the OWC includes concentric inner and outer annular races 62 and 64, respectively. The inner race 62 is secured to the TC output shaft 46, e.g., via splined interface 51, for common rotation therewith. Likewise, the inner race 62 is also secured to the damper assembly 30, e.g., via damper tang 54, for common rotation therewith. For at least some embodiments, the damper tang 54 and inner race 62 maybe integrally formed as a single-piece unitary structure. OWC outer race 64, in contrast, is secured to the turbine blades 29, e.g., by way of rigid coupling to the turbine shell 39 via rivets 47, for common rotation therewith. Disposed between and rotatably coupling the inner and outer races 62, 64 of the OWC 60 is a plurality of circumferentially spaced rollers 66. Alternative configurations may incorporate sprags, ratchet teeth-and-pawl elements, spring-biased rollers, etc., instead of or in addition to the rollers 66.

During a positive torque operating mode (portrayed by arrow 58 in FIG. 3), such as when the automobile 10 is accelerating from a stoplight and shifting through a low gear sequence, the TCC 28 is open and the OWC 60 contemporaneously locks such that the turbine 24 is mechanically coupled to the TC output shaft 46. For direct connect and slip control during positive torque, the TCC 28 is actuated and the OWC 60 remains locked such that the engine 14, by way of front cover 33 and clutch plate 52, is mechanically coupled to the TC output shaft 46. For engine restart, e.g., post sailing, E-cruising, E-launch, etc., the TCC 28 is open and the OWC 60 automatically locks at the desired engine speed when the associated turbine speed synchronizes with the transmission input speed, while the torsional damper assembly 28 dampens out engine torsionals during restart. The OWC 60 simplifies control for engine-transmission sync during engine restart because, unlike a standard friction clutch that must typically be continuously controlled to properly sync the engine output and transmission input while engine is restarted and accelerated to a desire speed, the OWC 60 of FIG. 2 is a passive device that automatically couples the driving and driven elements to make this transition seamless without continuous ECU control.

During a zero-torque operating mode, such as when the automobile 10 is sailing or for a regenerative braking operation, the TCC 28 is open and the OWC 60 contemporaneously freewheels. In so doing, the engine 14 is operatively disconnected from the transmission 12 to ensure that drivetrain torque is not transmitted back to the engine 14. During a negative torque operating mode (portrayed by arrow 68 in FIG. 3), such as for an engine braking operation, the TCC 28 is actuated while the OWC 60 contemporaneously freewheels. This allows the decelerating engine to couple to the final drive and concomitantly decelerate the final drive wheels.

While aspects of the present disclosure have been described in detail with reference to the illustrated embodiments, those skilled in the art will recognize that many changes may be made thereto without departing from the scope of the present disclosure. The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and subcombinations of the preceding elements and features.

What is claimed:

1. A hydrokinetic torque converter assembly for operatively connecting an engine with a power transmission of a motor vehicle, the engine having an engine output shaft, and the transmission having a transmission input shaft, the torque converter assembly comprising: a torque converter (TC) housing with an internal fluid chamber; an impeller with impeller blades rotatable within the fluid chamber, the impeller being configured to operatively connect to the engine output shaft; a turbine with turbine blades rotatable within the fluid chamber, the turbine being configured to operatively connect to the transmission input shaft via a TC output shaft; a torque converter clutch (TCC) disposed within the TC housing and coupled to the TC output shaft, the TCC being selectively actuable to lock the impeller to the TC output shaft; a damper assembly disposed within the TC housing and coupled to the TCC, the damper assembly being configured to dampen vibrations transmitted by the TCC; and a disconnect device disposed within the TC housing and coupled to the damper assembly and the TC output shaft, the disconnect device including a one-way clutch (OWC) with concentric inner and outer races and a plurality of rollers, sprags, pawls, and/or struts rotatably coupling the inner race to the outer race, the inner race being integrally formed with a damper tang of the damper assembly for common rotation therewith, and the outer race being rigidly secured to the turbine for common rotation therewith, the disconnect device being configured to drivingly connect the turbine to the TC output shaft and the damper assembly when torque is being transferred from the turbine to the TC output shaft in a first direction, and configured to drivingly decouple the turbine from the TC output shaft and the damper assembly when the torque reverses to a second direction.

2. The torque converter assembly of claim 1, wherein the disconnect device is a passive clutching mechanism or an active clutching mechanism.

3. The torque converter assembly of claim 1, wherein the disconnect device is disposed within the fluid chamber of the TC housing.

4. The torque converter assembly of claim 1, wherein the inner race is secured for common rotation with the TC output shaft.

5. The torque converter assembly of claim 1, wherein the damper tang is biased against a plurality of spring elements.

6. The torque converter assembly of claim 4, wherein the inner race is splined to the TC output shaft.

7. The torque converter assembly of claim 1, wherein the turbine includes a turbine hub rigidly connected to a turbine shell from which the turbine blades project, and wherein the outer race of the OWC is integrally formed with the turbine hub.

8. The torque converter assembly of claim 1, wherein the turbine blades project from a turbine shell, and wherein the outer race is rigidly coupled to the turbine shell.

9. The torque converter assembly of claim 1, further comprising a stator interposed between the impeller and the turbine, wherein the disconnect device is sandwiched between the stator and a clutch plate of the TCC, and is circumscribed by an annular damper flange of the damper assembly.

10. The torque converter assembly of claim 1, wherein the OWC includes the plurality of rollers, the plurality of rollers being disposed between and circumferentially spaced around the inner and outer races.

11. The torque converter assembly of claim 1, further comprising a stator disposed within the fluid chamber and interposed between the impeller blades and the turbine blades, wherein the disconnect device is disposed within the TC housing positioned between the stator and a clutch plate of the TCC.

12. A motor vehicle, comprising: an internal combustion engine with an engine output shaft; a multi-speed power transmission having transmission input and output shafts; a final drive system connecting the transmission output shaft to a plurality of drive wheels; and a torque converter assembly operatively connecting the internal combustion engine with the power transmission, the torque converter assembly comprising: a torque converter (TC) housing with a pump shell fixedly attached to a front cover to internally define therebetween a fluid chamber; an impeller with impeller blades rotatable inside the fluid chamber, the impeller blades projecting from the pump shell and operatively connected to the engine output shaft via the front cover; a turbine with turbine blades rotatable inside the fluid chamber, the turbine including a turbine shell operatively connected to the transmission input shaft via a TC output shaft; a torque converter clutch (TCC) disposed inside the TC housing, the TCC including a clutch plate coupled to the TC output shaft, the TCC being selectively actuable to lock the pump shell to the TC output shaft; a torsional damper assembly disposed inside the TC housing and coupled to the TCC, the damper assembly being configured to dampen vibrations transmitted by the TCC; and a passive-type one-way clutch (OWC) disposed inside the TC housing between the pump shell and front cover and coupled to the damper assembly and the TC output shaft, the OWC including concentric inner and outer races with a plurality of rollers, sprags, pawls, and/or struts rotatably coupling the inner race to the outer race, the inner race being integrally formed with a damper tang of the damper assembly for common rotation therewith, and the outer race being rigidly secured to the turbine for common rotation therewith, wherein the OWC is configured to automatically drivingly connect the turbine shell to the TC output shaft and the torsional damper assembly when positive torque is being transferred from the turbine to the TC output shaft, and configured to automatically drivingly disconnect the turbine shell from the TC output shaft and the torsional damper assembly when the torque reverses direction.

13. A method of constructing a hydrokinetic torque converter assembly configured to operatively connect an engine with a power transmission of a motor vehicle, the engine having an engine output shaft, and the transmission having a transmission input shaft, the method comprising: attaching an impeller with impeller blades to a torque converter (TC) housing with an internal fluid chamber such that the impeller blades are rotatable within the fluid chamber, the impeller being configured to operatively connect to the engine output shaft; attaching a turbine with turbine blades to the TC housing such that the turbine blades are rotatable within the fluid chamber, the turbine being configured to operatively connect to the transmission input shaft via a TC output shaft; attaching a torque converter clutch (TCC) to the TC output shaft within the TC housing, the TCC being selectively actuable to lock the impeller to the TC output shaft; attaching a damper assembly to the TCC within the TC housing, the damper assembly being configured to dampen vibrations transmitted by the TCC; and attaching a disconnect device to the damper assembly and the TC output shaft within the TC housing, the disconnect device including a one-way clutch (OWC) with concentric inner and outer races and a plurality of rollers, sprags, pawls, and/or struts rotatably coupling the inner race to the outer race, the inner race being integrally formed with a damper tang of the damper assembly for common rotation therewith, and the outer race being rigidly secured to the turbine for common rotation therewith, the disconnect device being configured to drivingly connect the turbine to the TC output shaft and the damper assembly when torque is being transferred from the turbine to the TC output shaft in a first direction, and configured to drivingly disconnect the turbine from the TC output shaft and the damper assembly when the torque reverses to a second direction.

14. The method of claim 13, wherein the disconnect device is a passive clutching mechanism or an active clutching mechanism.

15. The method of claim 13, wherein the disconnect device is disposed within the fluid chamber of the TC housing.

16. The method of claim 13, wherein the inner race is secured for common rotation with the TC output shaft.

17. The method of claim 13, wherein the turbine includes a turbine hub rigidly connected to a turbine shell from which the turbine blades project, and wherein the outer race is integrally formed with the turbine hub.

18. The method of claim 13, wherein the OWC includes the plurality of rollers, the plurality of rollers being disposed between and circumferentially spaced around the inner and outer races.

19. The torque converter assembly of claim 13, wherein the damper tang is biased against a plurality of spring elements.

20. The method of claim 13, further comprising disposing a stator within the fluid chamber interposed between the impeller blades and the turbine blades, wherein the disconnect device is disposed within the TC housing positioned between the stator and a clutch plate of the TCC.

* * * * *